(12) United States Patent
Colignon

(10) Patent No.: US 7,152,397 B2
(45) Date of Patent: Dec. 26, 2006

(54) ADDITIONAL SYSTEM FOR ASSISTING REGENERATION OF POLLUTION CONTROL MEANS OF A MOTOR VEHICLE

(75) Inventor: Christophe Colignon, Levallois Perret (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 0 days.

(21) Appl. No.: 10/567,191

(22) PCT Filed: Oct. 6, 2004

(86) PCT No.: PCT/FR2004/002445

§ 371 (c)(1),
(2), (4) Date: Feb. 3, 2006

(87) PCT Pub. No.: WO2005/054650

PCT Pub. Date: Jun. 16, 2005

(65) Prior Publication Data

US 2006/0248879 A1    Nov. 9, 2006

(30) Foreign Application Priority Data

Nov. 7, 2003    (FR) .................................. 03 13164

(51) Int. Cl.
*F01N 3/00*    (2006.01)
(52) U.S. Cl. ........................... 60/295; 60/280; 60/286; 60/297; 60/301; 60/603

(58) Field of Classification Search .................. 60/280, 60/285, 286, 295, 297, 301, 311, 602, 603
See application file for complete search history.

(56) References Cited

U.S. PATENT DOCUMENTS

| 5,050,376 | A | 9/1991 | Stiglic et al. | |
| 6,644,020 | B1* | 11/2003 | Kuenstler et al. | 60/286 |
| 6,829,890 | B1* | 12/2004 | Gui et al. | 60/295 |
| 6,843,055 | B1* | 1/2005 | Ootake | 60/297 |
| 6,851,258 | B1* | 2/2005 | Kawashima et al. | 60/311 |
| 6,931,842 | B1* | 8/2005 | Ohtake et al. | 60/295 |
| 7,007,463 | B1* | 3/2006 | Shirakawa | 60/297 |
| 2003/0056498 | A1 | 3/2003 | Kuenstler et al. | |

FOREIGN PATENT DOCUMENTS

FR    2804168 A    7/2001

\* cited by examiner

*Primary Examiner*—Binh Q. Tran
(74) *Attorney, Agent, or Firm*—Nicolas E. Seckel

(57) ABSTRACT

This system, in which the engine is associated with a turbocharger and with a feed device adapted to implement first and second regeneration strategies depending on different engine operation control parameters to obtain different temperatures in the exhaust line, acquires the temperature in the line, compares it with a safety threshold for the turbocharger turbine so that if the threshold is exceeded while applying the second strategy, the feed device is controlled so that one of the engine operation control parameters is regulated to reduce the temperature, and if it does not drop back below the threshold at the end of a first time period, the feed device is controlled to switch over to the first strategy, and if it still does not drop back below the threshold at the end of a second time period, the feed device is controlled to stop the regeneration strategy.

13 Claims, 1 Drawing Sheet

ADDITIONAL SYSTEM FOR ASSISTING REGENERATION OF POLLUTION CONTROL MEANS OF A MOTOR VEHICLE

The present invention relates to a system for assisting the regeneration of depollution means integrated in an exhaust line of a motor vehicle diesel engine.

More particularly, the invention relates to such a system in which the engine is associated with a turbocharger and with common manifold or "rail" feed means for injecting fuel into the cylinders of the engine, using at least one post-injection operation, and adapted, at constant torque, to implement at least two regeneration strategies at a first level and at a second level, depending on different engine operation control parameters, in order to obtain different temperature levels in the exhaust line, the temperature level corresponding to the second level strategy being higher than that corresponding to the first level strategy.

BACKGROUND ART

When regenerating depollution means, such as a particle filter, an oxidation catalyst that has been poisoned by sulfur, a NOx trap that needs to be desulfized, or a SOx trap, it is necessary to raise the temperature of the engine exhaust gas considerably in order to obtain regeneration that is rapid, so as to minimize the overconsumption of fuel that is associated with such regeneration.

Unfortunately, this requires a very considerable increase in the temperature of the exhaust line and consequently in the temperature of the elements integrated therein.

Some strategies also rely on using the conversion of unburned hydrocarbons coming from the combustion in the engine, by making use of catalyst-forming means for the purpose of further raising the temperature level in the exhaust line.

However, temperature levels that are too high can lead to breakage, e.g. of the turbine portion of the turbocharger.

It is therefore necessary to have good control over the temperature levels involved during regeneration.

SUMMARY OF THE INVENTION

The object of the invention is thus to solve these problems.

To this end, the invention provides a system for assisting the regeneration of depollution means integrated in an exhaust line of a motor vehicle diesel engine, in which the engine is associated with a turbocharger and with common rail feed means for injecting fuel into the cylinders of the engine in at least one post-injection, and adapted to implement, at constant torque, at least two regeneration strategies, at a first level and at a second level, depending on different engine operation control parameters, in order to obtain different temperature levels in the exhaust line, the temperature level corresponding to the second level strategy being higher than the temperature level corresponding to the first level, the system being characterized in that it includes acquisition means for acquiring the temperature level in the exhaust line, comparator means for comparing said temperature level with a safety threshold value for the turbine of the turbocharger so that in the event of said threshold value being exceeded while applying the second level strategy, the feed means are controlled so as to regulate at least one of the engine operation control parameters progressively so as to reduce the temperature level in the exhaust line, and if said temperature level does not drop below the threshold value at the end of a predetermined first time period, the feed means are controlled to switch over to the first level strategy, and if the temperature level in the exhaust line still does not drop below the safety threshold value at the end of a second time period, the feed means are controlled to stop the regeneration strategy.

According to other characteristics:

the feed means are adapted to implement two successive post-injections;

during regulation, the feed means are adapted to reduce progressively the flow rate of fuel during the second post-injection;

the feed means are adapted to reduce the flow rate of the second post-injection by using a correction factor lying in the range 0 to 1 and determined on the basis of the difference between the temperature level acquired from the exhaust line and the safety threshold value;

the correction factor is determined by a PI type regulator having non-linear gain;

the temperature level acquisition means comprise at least one temperature sensor;

the safety threshold value is calibratable;

the depollution means comprise a particle filter;

the depollution means comprise a NOx trap;

the depollution means comprise an oxidation catalyst;

the depollution means comprise a SOx trap;

the fuel includes an additive for being deposited, together with the particles with which it is mixed, on the depollution means in order to facilitate regeneration thereof; and the fuel includes an additive forming a NOx trap.

BRIEF DESCRIPTION OF THE DRAWINGS

The invention can be better understood on reading the following description given purely by way of example and made with reference to the accompanying drawing, in which.

DETAILED DESCRIPTION OF PARTICULAR EMBODIMENTS

Figure 1:
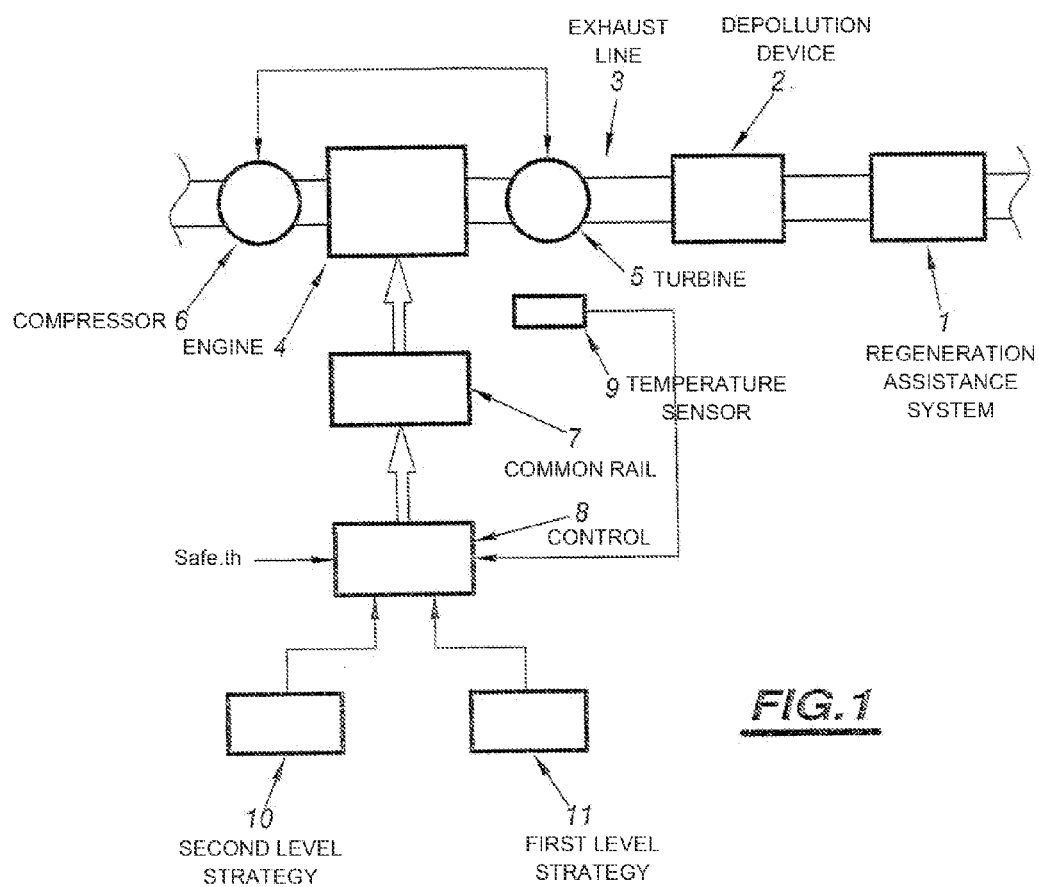
FIG. 1 is a block diagram showing the structure of a system of the invention for assisting regeneration.

FIG. 1 shows a system, given overall reference 1, for assisting the regeneration of depollution means generally associated with oxidation catalyst-forming means, given overall reference 2, that are integrated in an exhaust line, given overall reference 3, of a motor vehicle diesel engine 4.

The catalyst-forming means are placed upstream from the depollution means.

The engine is associated with a turbocharger having a turbine portion 5 disposed in the exhaust line and a compressor portion 6 disposed upstream from the engine.

By way of example, the depollution means may comprise a particle filter, a NOx trap, an oxidation catalyst, a SOx trap, etc.

It should also be observed that, in conventional manner, the fuel may include an additive for becoming deposited, together with the particles of which it is mixed, on the depollution means in order to facilitate regeneration thereof by lowering the combustion temperature of soot trapped thereon.

In conventional manner, the additive is present in the particles after the fuel with additive has been burnt in the engine.

An additive constituting a NOx trap may also be envisaged.

The engine is also associated with common rail feed means for injecting fuel into the cylinders of the engine using at least one post-injection.

These means are given overall reference 7 in this figure and they are associated with control means, given overall reference 8, serving, at constant torque, to implement at least two regeneration strategies, at a first level and at a second level, depending on different engine operation control parameters, so as to obtain different temperature levels in the exhaust line, with the temperature level corresponding to the second level strategy being higher than the temperature level corresponding to the first level strategy.

This is then done by modifying the engine operation control parameters, such as its admission air, by regulating the admission butterfly valve to the engine, by regulating the setpoint pressure for the turbocharger, or by regulating the quantity of fuel that is injected into the engine, e.g. during the post-injections, in conventional manner.

Such depollution means can be regenerated by making use of multiple injections into the cylinders of the engine, in particular during their expansion stages.

In order to limit the temperature level in the exhaust line during regeneration, the control means continuously monitor the temperature therein, in order to adapt the characteristics of the various injections (flow rate, start of injection, etc. . . . ) so as to reduce the temperature level in the exhaust line when it is too high.

The system includes acquisition means for acquiring the temperature level in the exhaust line, given overall reference 9 in the figure, comparator means for comparing said temperature level with a safety threshold level for the turbocharger compressor, constituted by the control means 8, so that in the event of said threshold value being exceeded while the second level strategy is being applied, designated by overall reference 10, to control the feed means 7 in such a manner as to regulate progressively at least one of the engine operation control parameters so as to reduce the temperature level in the exhaust line, and if said level does not come back below the threshold value at the end of a first predetermined time period, to control the feed means to switch over to the first level strategy, given overall reference 11, and if the temperature level in the exhaust line still does not come back below the security threshold value at the end of a second predetermined time period, to control the feed means to stop implementing the regeneration strategy.

The means 9 for acquiring the temperature level in the exhaust line may comprise a temperature sensor placed therein, e.g. close to the turbine portion of the turbocharger.

Figure 2:
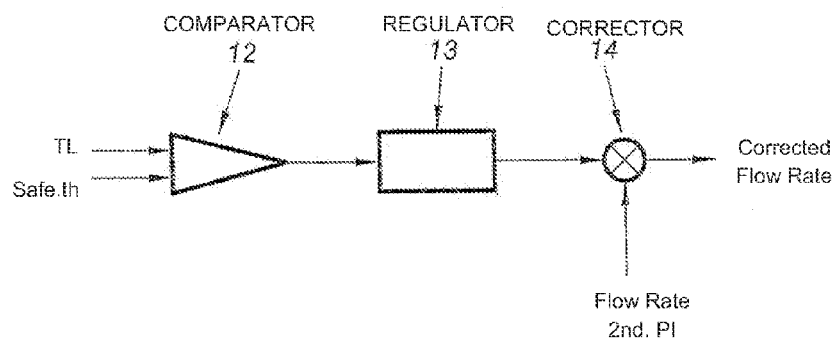
FIG. 2 shows the operation of control means involved in constituting such a system for assisting regeneration.

FIG. 2 shows how regulation is performed, and it can be seen that a comparator, given overall reference 12, receives as one of its inputs the safety threshold safe.th from the turbocharger turbine, and the temperature level TL in the exhaust line, acquired in the manner described above.

The output from the comparator 12 is connected to a PI type regulator having non-linear gain, given overall reference 13, that is adapted to deliver correction information to a corrector 14 for progressively reducing the fuel flow rate in a second post-injection in the event that the feed means 7 are adapted to enable two successive post-injections.

It can thus be understood that under such circumstances the feed means 7 are adapted to reduce the flow rate of the second post-injection by using a correction factor lying in the range 0 to 1 and determined on the basis of the difference between the temperature level TL in the exhaust line and the safety threshold safe.th.

Naturally, the safety threshold value can be calibratable.

It can thus be understood that the purpose of the system is to limit the temperature level in the exhaust line so as to preserve the integrity of the turbocharger turbine.

Excessive temperature peaks can then occur only when the regeneration assistance system is operating at the second level.

By comparing the instantaneously measured temperature with a threshold, it is possible to determine whether or not a critical temperature has been exceeded.

Thereafter, as a function of the difference relative to the threshold, the regeneration assistance strategy (flow rates and phase offsets for the various injections) is modified so as to reduce the temperature while continuing to deliver constant torque, e.g. by reducing the post-injection flow rate.

In the example described, the regeneration strategy uses multiple injections, and in particular it uses two post-injections. Calibration can then be performed for the second post-injection.

The quantity of fuel involved in post-injection is corrected so long as the temperature level in the exhaust line remains above the safety threshold. If in spite of reducing the quantities injected the temperature level does not drop back below the threshold at the end of the first time period, then the system is forced to switch over to the first level strategy.

If even after switching over to said first level strategy the temperature level continues to remain excessive for a predetermined time period, then regeneration is switched off.

Thus, if the temperature level TL.line in the line as measured by the temperature in the line exceeds a calibratable threshold T.max, then the second post-injection flow rate is reduced progressively by being multiplied by a correction factor, Kturbine, lying in the range 0 to 1, given by a PI type regulator with non-linear gain as a function of the temperature difference between the measured value and the safety value for the turbine.

A timer tst is then triggered. At the end of a calibratable time t.safe.turbine, the regeneration system is forced to the first level during a calibratable minimum time t.level1.turbine. If at the end of this time t.level1.turbine, the temperature level has still not dropped below the safety threshold T.max, then regeneration is stopped.

It will be understood that such a system enables operating safety to be ensured for the turbine of the turbocharger.

Naturally, other embodiments could be envisaged.

Thus, for example, the depollution means and the oxidation catalyst-forming means could be integrated in a single element, in particular on a common substrate.

By way of example, a particle filter integrating the oxidation function could be envisaged.

Similarly, a NOx trap integrating such an oxidation function could also be envisaged, whether or not an additive is used.

This oxidation function and/or NOx trap can be implemented, for example, by means of an additive mixed in with the fuel.

Finally, the depollution means may also include an oxidation catalyst or SOx trap.

The invention claimed is:

1. A system for assisting the regeneration of depollution means integrated in an exhaust line of a motor vehicle diesel engine, in which the engine is associated with a turbocharger and with common rail feed means for injecting fuel into the cylinders of the engine in at least one post-injection, and adapted to implement, at constant torque, at least two regeneration strategies at a first level and at a second level, depending on different engine operation control parameters, in order to obtain different temperature levels in the exhaust line, the temperature level corresponding to the second level strategy being higher than the temperature level corresponding to the first level, the system including acquisition means for acquiring the temperature level in the exhaust line, comparator means for comparing said temperature level with a safety threshold value for the turbine of the turbocharger so that in the event of said threshold value being exceeded while applying the second level strategy, the feed means are controlled so as to regulate at least one of the engine operation control parameters progressively so as to reduce the temperature level in the exhaust line, and if said temperature level does not drop below the threshold value at the end of a predetermined first time period, the feed means are controlled to switch over to the first level strategy, and if the temperature level in the exhaust line still does not drop below the safety threshold value at the end of a second time period, the feed means are controlled to stop the regeneration strategy.

2. The system according to claim 1, wherein the feed means are adapted to implement two successive post-injections.

3. The system according to claim 2, wherein during regulation, the feed means are adapted to reduce progressively the flow rate of fuel during the second post-injection.

4. The system according to claim 3, wherein the feed means are adapted to reduce the flow rate of the second post-injection by using a correction factor lying in the range 0 to 1 and determined on the basis of the difference between the temperature level acquired from the exhaust line and the safety threshold value.

5. The system according to claim 4, wherein the correction factor is determined by a PI type regulator having non-linear gain.

6. The system according to claim 1, wherein the temperature level acquisition means comprise at least one temperature sensor.

7. The system according to claim 1, wherein the safety threshold value is calibratable.

8. The system according to claim 1, wherein the depollution means comprise a particle filter.

9. The system according to claim 1, wherein the depollution means comprise a NOx trap.

10. The system according to claim 1, wherein the depollution means comprise a SOx trap.

11. The system according to claim 1, wherein the depollution means comprise an oxidation catalyst.

12. The system according to claim 1, wherein the fuel includes an additive for being deposited, together with the particles with which it is mixed, on the depollution means in order to facilitate regeneration thereof.

13. The system according to claim 1, wherein the fuel includes an additive forming a NOx trap.

* * * * *